(12) United States Patent
Chen (10) Patent No.: US 6,363,190 B1
(45) Date of Patent: Mar. 26, 2002

(54) POLARIZATION INSENSITIVE FUSED FIBER COUPLER METHOD AND APPARATUS

(75) Inventor: Peter Z. Chen, Santa Clara, CA (US)

(73) Assignee: New Focus, Inc., Santa Clara, CA (US)

( * ) Notice: Subject to any disclaimer, the term of this patent is extended or adjusted under 35 U.S.C. 154(b) by 0 days.

(21) Appl. No.: 09/502,973

(22) Filed: Feb. 11, 2000

(51) Int. Cl.[7] .................................................. G02B 6/26
(52) U.S. Cl. ......................................... 385/43; 385/42
(58) Field of Search ...................................... 385/42, 43

(56) References Cited

U.S. PATENT DOCUMENTS

| RE33,296 E | * | 8/1990 | Stowe et al. ............... 350/320 |
| 5,058,979 A | * | 10/1991 | Yamauchi et al. ............. 385/28 |
| 5,408,555 A | | 4/1995 | Fielding et al. ............... 385/43 |
| 5,491,764 A | | 2/1996 | Hu et al. ..................... 385/24 |
| 5,652,819 A | * | 7/1997 | Orazi ......................... 385/51 |
| 5,809,190 A | | 9/1998 | Chen ........................... 395/43 |
| 5,949,936 A | * | 9/1999 | Chen ........................... 385/50 |
| 5,956,441 A | | 9/1999 | Fairchild et al. ............. 385/27 |
| 5,987,201 A | * | 11/1999 | Chen ........................... 385/43 |
| 6,148,129 A | * | 11/2000 | Pan et al. ..................... 385/42 |
| 6,169,830 B1 | * | 1/2001 | Kewitsch et al. ............. 385/37 |

OTHER PUBLICATIONS

Electronics Letters—An International Publication, Mar. 15, 1990, vol. 26, No. 6.

* cited by examiner

*Primary Examiner*—Hung N. Ngo
*Assistant Examiner*—Jennifer Doan
(74) *Attorney, Agent, or Firm*—Sierra Patent Group, Ltd.

(57) ABSTRACT

Disclosed is a fiber optic coupler which includes a fused, stretched, and twisted biconical tapered region; a first pair of fiber pigtail ends extending from a first end of said biconical tapered region; a second pair of fiber pigtail ends extending from a second end of said biconical tapered region; and polarization dependent loss preclusion means disposed within said biconical tapered region. Further disclosed is a method for forming the polarization insensitive coupler as described.

18 Claims, 8 Drawing Sheets

(Prior Art)

Fig. 10

Δλ₁ Window Spacing
Δλ₂ Channel Spacing

POLARIZATION INSENSITIVE FUSED FIBER COUPLER METHOD AND APPARATUS

BACKGROUND OF THE INVENTION

1. Field of the Invention

The present invention relates generally to fiber optic couplers. More particularly, the present invention relates to polarization insensitive fused fiber optic couplers.

2. The Prior Art

Fiber optic couplers including a biconical tapered coupling region, three or four terminal ports, and a housing to maintain the coupling region in a stable environment are known and have been promoted in various forms. For instance, fiber optic couplers formed by fusing a pair of side-by-side optical fibers by heating and stretching the optical fibers and forming biconical tapered regions have been explored to certain limits. Such experimentation has resulted in light couplings, the utility of which is a function of the mode of the fiber and the length and shape of the coupling region. These prior art couplings suffer from polarization accumulation due to the consistently oriented elliptical shape of the cross-section of the fused fibers in the coupling region which may not only cause polarization dependent loss (PDL), but may also cause an envelope modulation of the light transmission spectrum in Wavelength Division Multiplexers (WDWs). Although it has been discovered that smaller channel spacing of WDMs may be achieved by increasing the length of the tapered section of the fused region, these devices have a tendency to also have a greater sensitivity to the input state of polarization.

Attempts to overcome such problems have resulted in subsequent twisting of the fused fibers after heating and stretching of the fibers such as reported by J. Wilkinson and C. J. Rowe in "Close-Spaced Fused Fibre Wavelength Division Multiplexers with Very Low Polarisation Sensitivity," Electronic Letters, Vol. 26, pp. 382–384 (1990). However, U.S. Pat. No. 5,408,555 to Fielding et. al. discussing a related, if not substantially similar, subject, seems to somewhat disparage the Wilkinson/Rowe findings. In particular, the Fielding patent takes issue with the Wilkinson/Rowe findings regarding the relationship of twisting on polarization and wavelength shifts.

Both sources seem to agree that the twisting step, properly applied may decrease the polarization sensitivity experienced previously. However, twisting produces undesirable bending stress and increases the potential for mechanical unreliability. Additionally, it is very difficult to adjust the output signals of the two fibers to a maximum and minimum respectively at a single wavelength when fabricating WDMs. Furthermore, the window spacing cannot be monitored when fabricating interleaving WDMs, or for example, DWDMs.

BRIEF DESCRIPTION OF THE INVENTION

To overcome these and other shortcomings of the prior art, disclosed herein is a technique for forming a polarization insensitive fused fiber optic coupler and a coupler resulting therefrom. The present invention provides a fused coupler in which two optical fibers are fused together and elongated to form a biconical taper for optical power coupling. The cross-sectional shape of the tapered region is elliptical thus producing birefringence. Due to the difference in coupling coefficients between two orthogonal polariztions, fused couplers generally exhibit polarization dependent loss (PDL). In order to form a polarization insensitive coupler, instead of elastically twisting the coupler after the fusing and elongating process, it has been found that non-elastic twisting can be accomplished by twisting the fibers in the coupling region during the fusing and elongating process or alternately twisting and heating the coupling region after the fusing and elongating process resulting in elimination of Polarization Dependent Loss (PDL). Furthermore, by twisting during fusing, complications associated with bending stresses previously known for twisting after fusing, is also substantially, if not completely, eliminated.

It is therefore an object of the present invention to produce a polarization insensitive fiber optic coupler that is also more resistant to bending stresses than previously known heretofore.

It is also an object of the present invention to produce a fiber optic coupler capable of withstanding greater fiber twisting as compared to the prior art coupling devices.

It is another object of the present invention to provide a method for forming the novel polarization insensitive fiber optic coupler.

It is yet another object of the present invention to provide a WDM and interleaving WDM that is polarization insensitive and envelope modulation free in the optical spectrum.

Viewed from a first vantage point a fiber optic coupler is disclosed, comprising in combination, a fused, stretched, and twisted biconical tapered region; a first pair of fiber pigtail ends extending from a first end of the biconical tapered region; a second pair of fiber pigtail ends extending from a second end of the biconical tapered region; and polarization dependent loss preclusion means disposed within the biconical tapered region.

Viewed from a second vantage point a method for forming a polarization insensitive fiber optic coupling is disclosed, comprising in combination, stripping cladding from a central region of each of two fibers; attaching the fibers to fiber holders and placing the fibers side by side; connecting a first end of one of the fibers to a light source and connecting a second end of that same fiber to a monitoring means; twisting the fibers about one another in one turn; substantially simultaneously heating and stretching the central stripped regions of the fibers; twisting the fibers about each other upon detection of light coupling via said monitoring means; discontinuing heating, stretching, and twisting upon detection of a predetermined coupling performance via the monitoring means; and trimming the coupling region.

Viewed from a third vantage point a fiber optic coupler, comprising in combination, a first pair of fiber optic pigtail ends; a second pair of fiber optic pigtail ends; a fused biconical tapered and twisted region extending between the first and second pair of pigtail ends; and a polarization insensitive coupling region within the tapered region.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
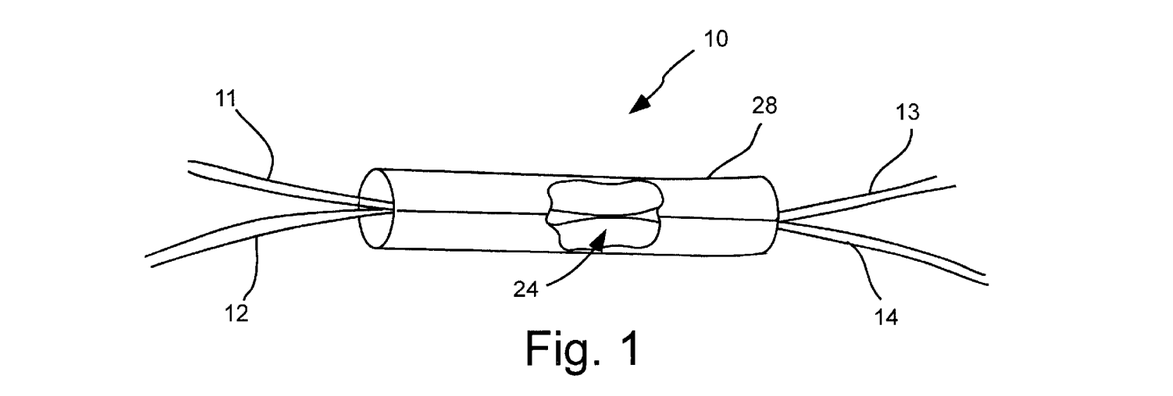
FIG. 1 is a schematic diagram of a fiber optic coupler according to the present invention within a housing.

Considering the drawing figures, wherein like reference numerals denote like parts throughout the various drawing figures, reference numeral 10 is directed to a fiber optic coupler according to the present invention. Referring now to FIG. 1, fiber coupler 10 includes a plurality of fiber pigtails 11, 12, 13, and 14, and a biconically tapered section 24 which is fixed to a substrate at both ends of the biconically tapered section 24 by using epoxy, or a similarly appropriate bonding material, and encapsulating the entirety within a housing 28.

Figure 2:
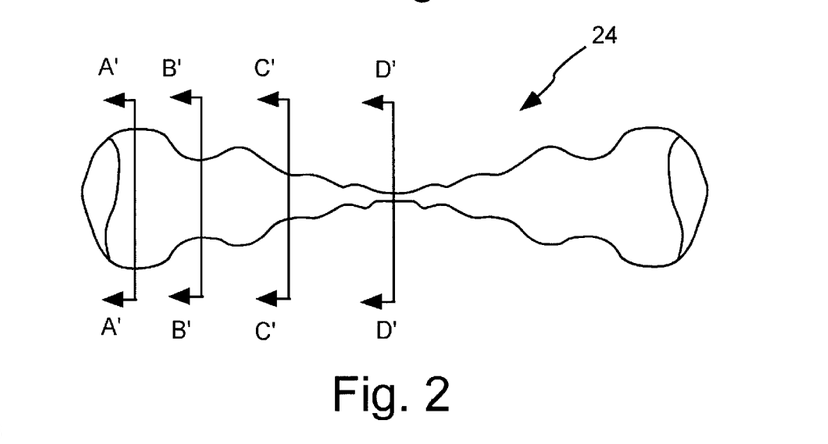
FIG. 2 is a schematic diagram of the biconical taper region of the present invention.
Figure 2A:
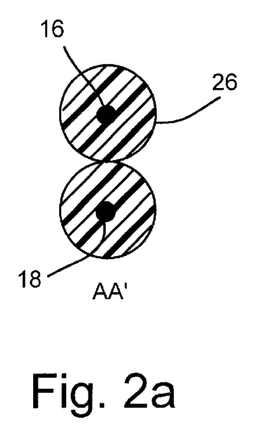
FIG. 2A is a cross-sectional view of the present invention taken along lines A—A of FIG. 2.
Figure 2B:
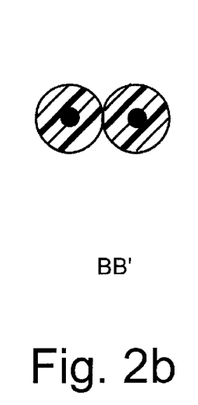
FIG. 2B is a cross-sectional view of the present invention taken along lines B—B of FIG. 2.
Figure 2C:
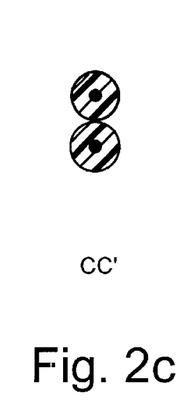
FIG. 2C is a cross-sectional view of the present invention taken along lines C—C of FIG. 2.
Figure 2D:
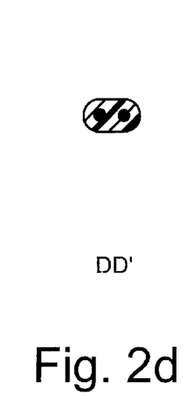
FIG. 2D is a cross-sectional view of the present invention taken along lines D—D of FIG. 2.
Figure 3:
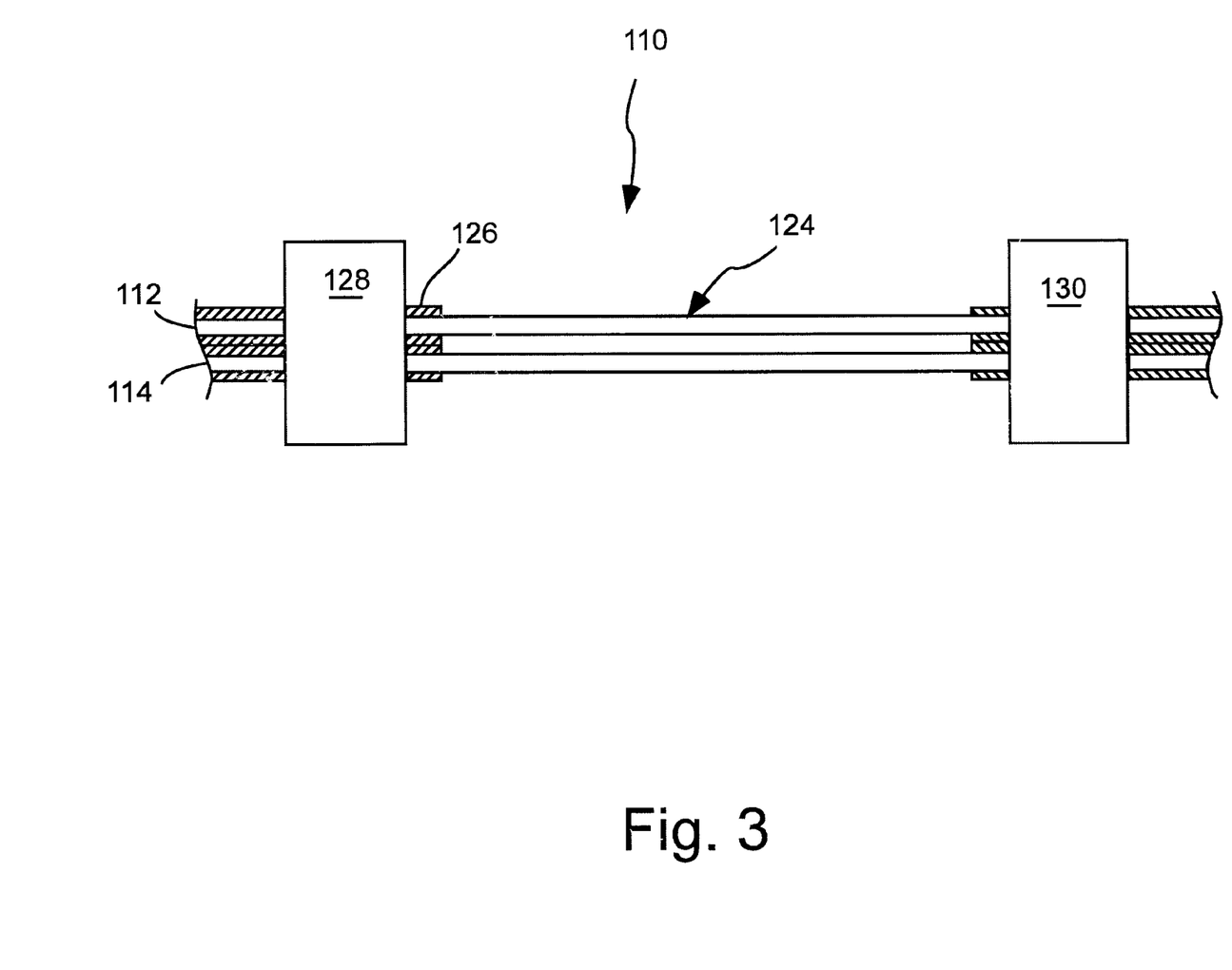
FIG. 3 is a schematic diagram of a pair of stripped fibers in an initial formation step of the present invention.

Also referring now to FIGS. 2, 2A, 2B, 2C, and 2D, the cross-sectional shape of the tapered section 24 gradually changes from a dumbbell shape at both ends, as depicted in FIG. 2A, of the biconically tapered section 24, to a substantially elliptical shape in the middle portion of the biconically tapered region 24 as depicted in FIG. 2D. The orientation of the elliptically shaped cross-section changes periodically along section 24 as can be seen in FIGS. 2A, 2B, 2C, and 2D, thereby substantially reducing the effect of birefringence and allowing the coupler 10 to exhibit polarization independence. Also, twisting during fusing and elongating, or alternating twisting and heating after fusing and elongating, can dramatically reduce the bending stresses associated with twisting after fusing and elongating, hence enhancing polarization insensitivity and increasing performance reliability.

Further, the optical fibers, 11, 12, 13, and 14, include, fiber optic cores 16 and 18. At a midsection 24, some or all of the cladding 26 is removed from the optical fibers, substantially exposing fiber optic cores 16 and 18. Furthermore, cores 16 and 18 are twisted about one another not only in the coupling region 24, but also beyond the coupling region 24. Significantly, due to an appropriate formation of these twistings and fusing, a resultant polar insensitive coupler 10 is thereby formed. Furthermore, the resultant coupler 10 of the present invention may include twists having rotation ranges of 0–100 turns per centimeter which is especially useful in narrowband spacing applications where more twists are found to be useful. It has been discovered that 2–20 turns/cm is the norm for most practical applications and 2–8 turns/cm seems to be preferred in most cases.

Therefore, due to the coupler 10 heretofore described, light may be propagated through at least one pigtail end 11, 12, 13, or 14 without regard for polarization. That is, and now referring to FIGS. 2A through 2D, a gradual change from a substantially dumbbell shaped cross-section to a substantially elliptical shaped cross-section may be seen in the middle of the taper region 24. Due to the twisting cross-sections, birefringence occurs periodically, with opposing birefringence occurring in differing twist sections of the coupling, thereby allowing the coupler to exhibit polarization independence. Of course the twisting periods must be of a specific character as well as the stretched, and therefore reduced cross-sectional area, nature of the coupling region as will be described hereinafter vis-a-vis the formation of said fiber coupling 10.

Furthermore, additional twisting may be achieved as compared to prior art couplers due to comparatively decreased bending stresses encountered due to twisting of the fibers. That is, prior art twisting occurring after heating and stretching was limited in the number of twists available because of bending stresses encountered due to degradation of the fiber during the heating and stretching step. By twisting the fibers concurrently with heating and stretching the fibers, such bending stresses are comparatively reduced and thus more twists may be employed. Hence, by being able to employ additional twists, enhanced fiber optic characteristics may be achieved.

Referring now to FIGS. 3 through 6, the preferred method and system 10 of forming the coupler 10 will hereinafter be described. To form the fused coupler 10 of the present invention, two lengths of optical fibers are first prepared for processing by baring midsections 124 of each down to a desirably substantially declad condition (see FIG. 3). The length of the declad portion of the fibers is preferably 25 mm. Thereafter, the fibers 112 and 114 are mounted in parallel on holding devices 128 and 130. Various clamping or holding devices may be employed for this purpose. The holding means of the device is further coupled to both a linear or axial drive means and rotational drive means. As can be appreciated by one having ordinary skill in the art, a variety of linear motors or manual techniques may be utilized as well for this purpose. It is preferred that a finely controllable drive means, such as a stepper motor, be employed so that a precise and variable rate of speed may be achieved. In particular, it is preferred that the rate of drawing of the fibers be programmable in the range of zero micrometers per second (0 $\mu$m/sec) to 400 $\mu$m/sec and that the rate of rotation be programmable in the range of zero turns per minute (0 turns/min) to 600 turns/min.

Figure 4:
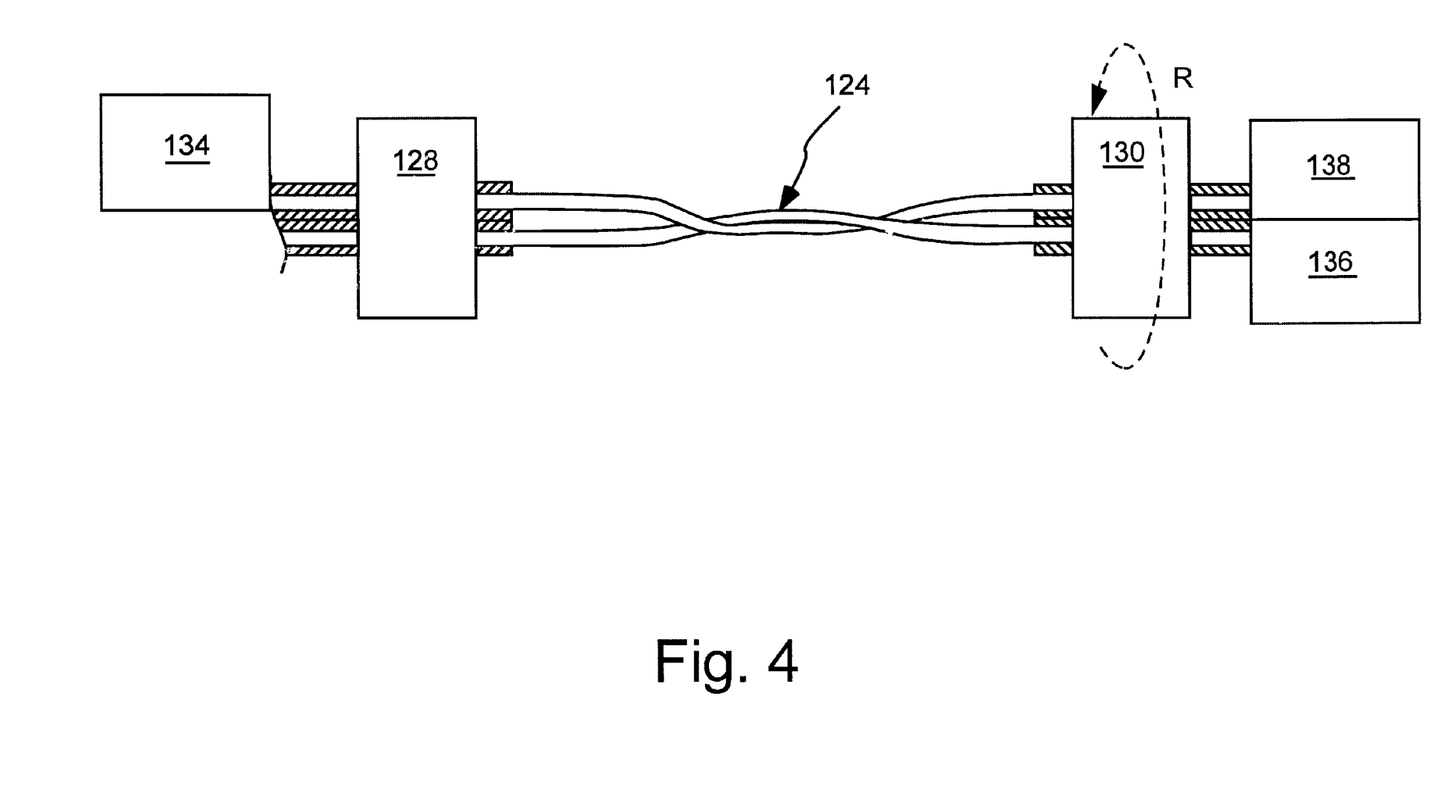
FIG. 4 is a schematic diagram of a pair of fibers twisted about one another prior to fusing and stretching of the present invention.

Thereafter, and referring now to FIG. 4, the fibers 112 and 114 are preferably twisted about one another (one turn) in the central declad region 124 about arc R. It should be noted, however, that fibers 112 and 114 may be twisted about one another in one turn prior to being mounted on holding devices 128 and 130, or alternatively, fibers 112 and 114 may be simply maintained in parallel juxtaposition with one another without twisting.

Figure 5:
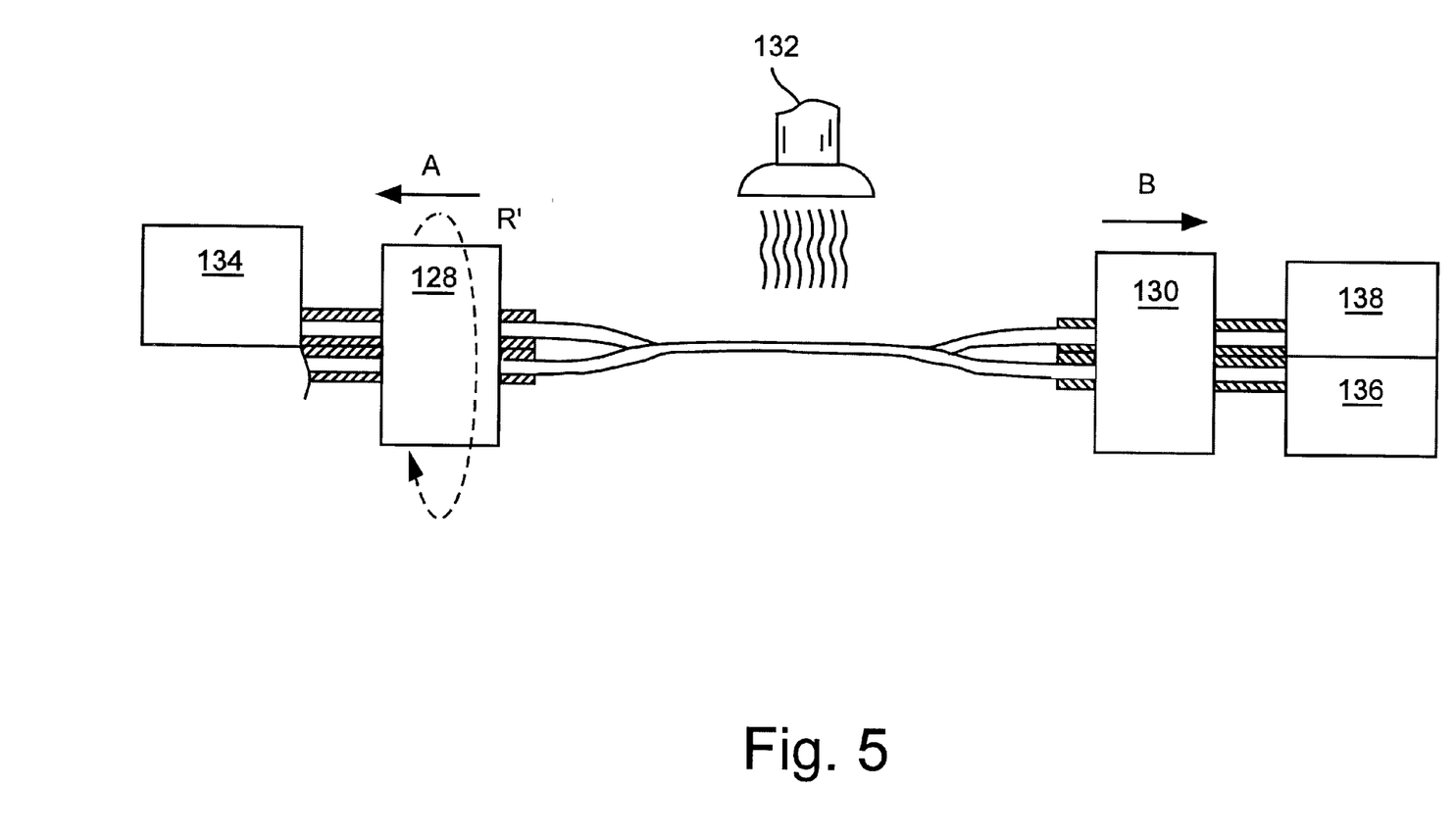
FIG. 5 is a schematic diagram depicting the fusing and stretching step of forming the inventive coupler.
Figure 6:
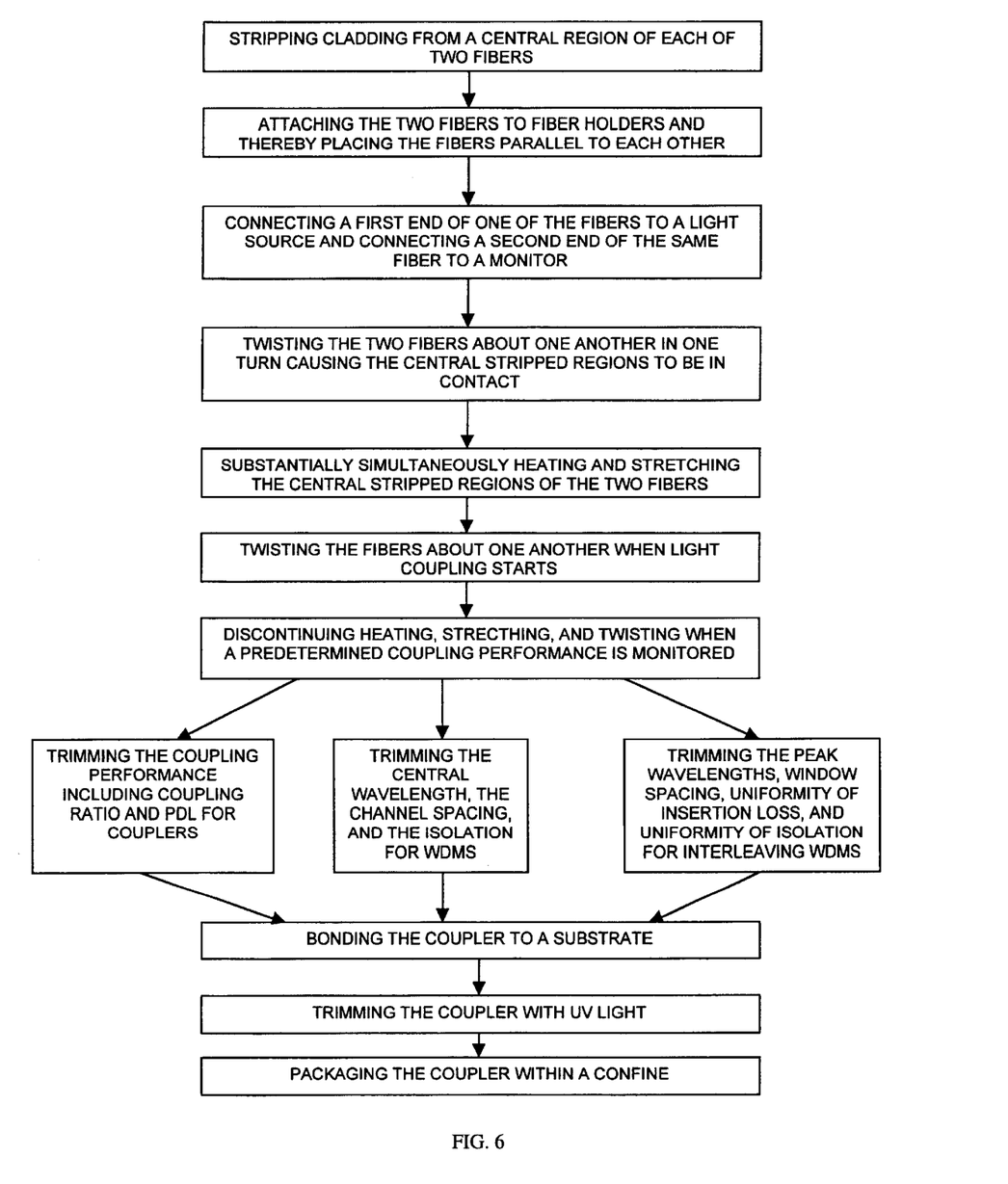
FIG. 6 is a flowchart of the method of making the inventive fiber optic coupler.

Next, and referring now to FIG. 5, either one of the fibers 112 or 114 is connected to a polarization controller and then to a light source 134 at one end while switchable monitors 136 and 138 are connected to fibers 112 and 114 at an opposite end and in operative communication with fibers 112 and 114. Then, while continuously monitoring the lights released from the releasing end of the fibers 112 and 114 by switchable monitors 136 and 138, simultaneously heating the central coupling region 124 via heat source 132, stretching the fibers 112 and 114 axially by the linear or axial drive in the direction of arrows A and/or B, and twisting the fibers 112 and 114 about one another by a rotational drive about arc R', a fiber coupler 10 may be formed. The monitors 136, 138 are optical spectral analyzers in the case of WDM fabrication and power meters in the case of coupler fabrication.

Another way to form the fiber coupler 10 is as follows: while continuously monitoring lights by monitors 136 and 138, simultaneously heating the central coupling region 124 via heat source 132 and stretching the fibers 112 and 114 axially along arrows A and B; then twisting the fibers 112 and 114 about one another by rotating holder 128 about arc R'; next, reheating the twisted region to reduce bending stresses; and repeating these steps as needed until a desirable coupling is achieved. Once a desirable coupling is achieved, heating and stretching ceases. Then while the coupling region is cooling, twisting the fibers further to compensate for losses due to cooling until a polarization insensitive state is finally achieved.

Figure 7:
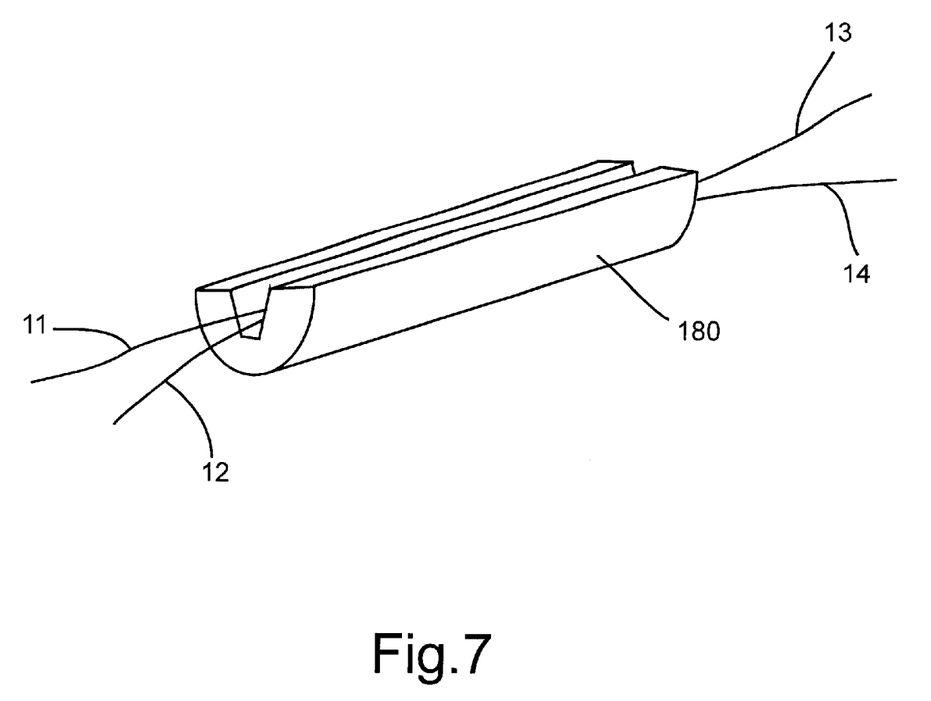
FIG. 7 is a schematic diagram of the present invention coupled to a substrate.
Figure 8:
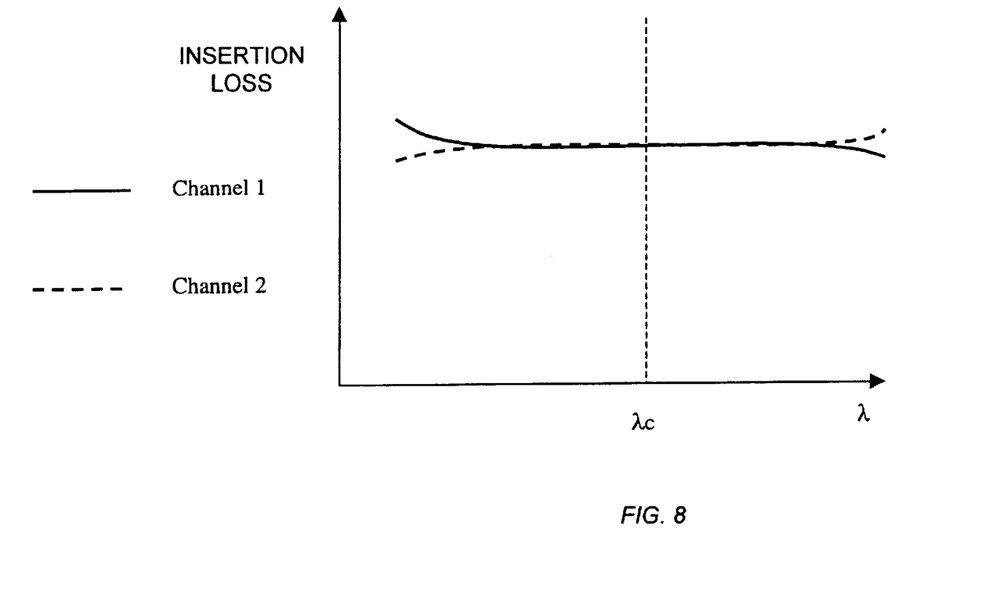
FIG. 8 is a graphical representation of data output from the inventive coupler.

In the final package stage, and referring now to FIG. 7, the non-elastically twisted fused fiber coupler is bound to substrate 180 at the two ends of the biconically tapered region. The substrate 180 may be a quartz sleeve, invar sleeve, or any other sleeves with low thermal expansion coefficients. The substrate may also be a composite material with a specified thermal expansion coefficient able to compensate for performance change due to refractive index change caused by temperature variations. The non-elastically twisted fused coupler is then encapsulated within a confine 28 which is hermetically sealed as shown in FIG. 1 to preclude harm from external forces or environmental condition variations. For a fiber optic coupler as described above, the insertion loss as a function of wavelength ($\lambda$) is graphically depicted in FIG. 8. By way of example but not limitation, in accordance with the above described fabrication method, a WDM coupler may be formed for a 1480/1550 nm application. More specifically, two Corning® SMF-28 optical fibers having core diameters of about 9 $\mu$m, a diameter with cladding of about 125 $\mu$m, and a diameter with coating of about 250 $\mu$m are provided. Next, a part of the coating, approximately 20 mm, of each of the fibers is removed. Thereafter, both fibers are placed in fiber holders and the exposed claddings are placed one next to the other of the two fibers.

Then, the exposed cladding regions are heated and elongated. While heating and elongating the fibers, a light having a wavelength band of about 80 nanometers (nm) at a central wavelength of about 1510 nm is introduced through one of the two ports of one of the fibers (referred to hereafter as the first fiber) and the power of the light exiting from the other port of that (first) fiber is monitored as a reference. After fusing and elongating the fibers, an optical coupling in which light having a 1550 nm wavelength is achieved at one of the ports of the second fiber. Most power of the light having a wavelength band of about 10 nm at the central wavelength of about 1550 nm is thus removed and released from the first fiber with very high insertion loss of more than 20 dB, and most of the power of the light having a wavelength band of about 10 nm at the central wavelength of about 1480 nm remains in the first fiber with very low insertion loss of less than 0.1 dB.

Thereafter, one of the fiber holders holding the ends of the two optical fibers is rotated approximately n turns with respect to the other fiber holder thereby providing a twist of n turns relative to the middle of the fused/elongated portion of the fibers. Then, the fibers are reheated and twisted additionally as needed until 100% of power at 1550 nm is achieved in the second fiber and 100% of power at 1480 nm remains in the first fiber. In this example, n=20, is not uncommon. Such a 1480/1550 nm WDM having been formed has been found to have a PDL of less than 0.1 dB.

Figure 9:
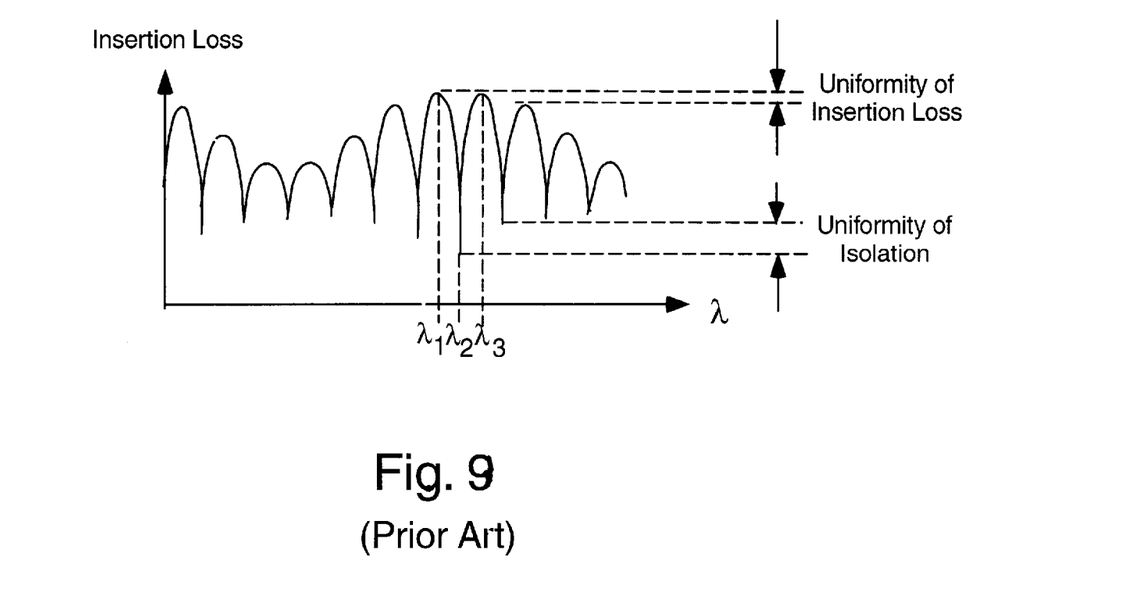
FIG. 9 is a graphical representation of data output from a prior art WDM.
Figure 10:
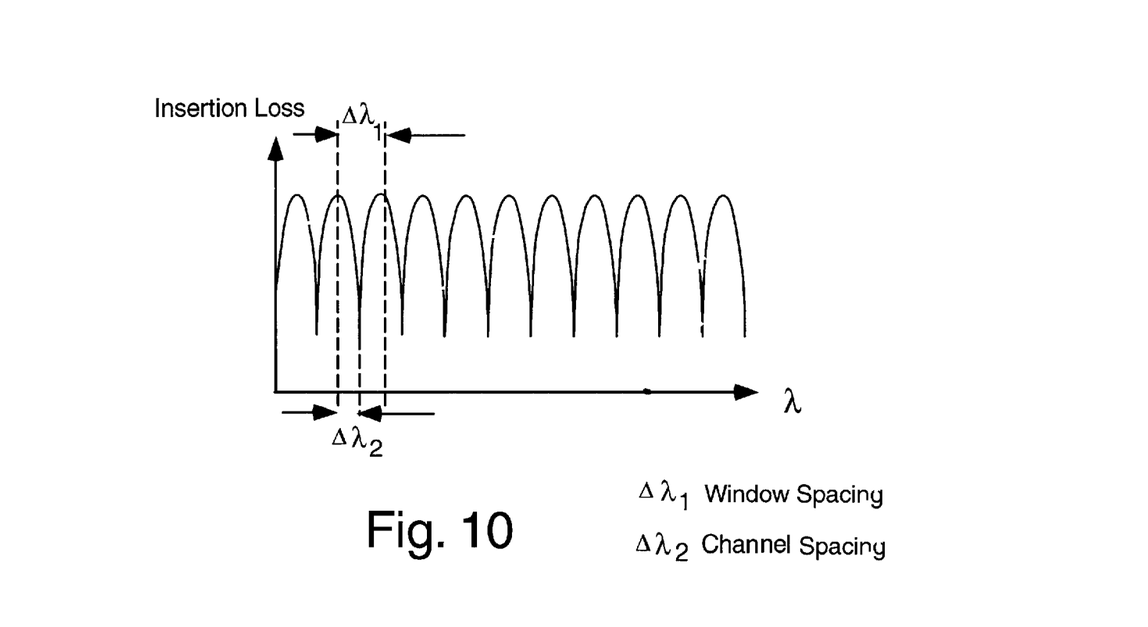
FIG. 10 is a graphical representation of data output from the inventive coupler in the form of a WDM.

Whereas FIG. 9 depicts a prior art WDM spectral transmission, FIG. 10 depicts a WDM spectral transmission of a WDM as just described. Furthermore, results show that the insertion loss at the peak wavelength for such a WDM as previously described is less than 0.2dB and the isolation between 1480 nm and 1550 nm is greater than 20 dB.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A fiber optic coupler, comprising in combination:
  a fused, stretched, twisted and trimmed biconical tapered region, wherein said trimming includes trimming the central wavelength, channel spacing, and isolation for wavelength division multiplexer applications;
  a first pair of fiber pigtail ends extending from a first end of said biconical tapered region;
  a second pair of fiber pigtail ends extending from a second end of said biconical tapered region; and
  polarization dependent loss preclusion means disposed within said biconical tapered region.

2. The fiber optic coupler of claim 1 further comprising a substrate underlying and attached to said coupler.

3. The fiber optic coupler of claim 2 further comprising a housing containing said coupler/substrate combination.

4. The fiber optic coupler of claim 3 wherein said biconical tapered region varies symmetrically from a substantially dumbbell-shaped cross-section to a substantially elliptical-shaped cross-section.

5. The fiber optic coupler of claim 4 further comprising fiber twisting beyond said ends of said biconical tapered region.

6. A method for a polarization insensitive fiber optic coupling, comprising in combination:
  stripping cladding from a central region of each of two fibers;
  attaching said fibers to fiber holders and placing said fibers side by side;
  connecting a first end of one of said fibers to a light source and connecting a second end of that same fiber to a monitoring means;
  twisting said fibers about one another in one turn;
  substantially simultaneously heating and stretching said central stripped regions of said fibers;
  twisting said fibers about each other upon detection of light coupling via said monitoring means;
  discontinuing heating, stretching, and twisting upon detection of a predetermined coupling performance via said monitoring means; and
  trimming said coupling region, wherein said trimming includes trimming the central wavelength, channel spacing, or isolation for wavelength division multiplexer applications.

7. The method of claim 6 further comprising bonding said coupler to a substrate.

8. The method of claim 7 further comprising trimming the coupler with ultraviolet radiation.

9. The method of claim 8 further comprising packaging said coupler within a housing.

10. The method of claim 9 wherein said trimming includes trimming the coupling performance including the coupling ratio.

11. The method of claim 6 further comprising trimming the peak wavelengths, window spacing, uniformity of insertion loss, and uniformity of isolation for interleaving wavelength division multiplexer applications.

12. The method of claim 6 wherein said trimming includes trimming the coupling performance including polarization dependent loss for coupling applications.

13. A fiber optic coupler, comprising in combination:
   a first pair of fiber optic pigtail ends;
   a second pair of fiber optic pigtail ends;
   a fused biconical tapered, twisted and trimmed region extending between said first and second pair of pigtail ends, wherein said trimming includes trimming the central wavelength, channel spacing, and isolation for wavelength division multiplexer applications; and
   a polarization insensitive coupling region within said tapered region.

14. A fiber optic coupler comprising:
   a fused, stretched, and twisted biconical means for coupling a pair of optical fibers;
   means for precluding polarization dependent loss disposed within said means for coupling a pair of optical fibers;
   wherein said means for coupling a pair of optical fibers is trimmed, including the central wavelength, channel spacing, and isolation for wavelength division multiplexer applications.

15. The fiber optic coupler of claim 14 further comprising a substrate underlying and attached to said coupler.

16. The fiber optic coupler of claim 15 further comprising a housing containing said coupler/substrate combination.

17. The fiber optic coupler of claim 16 wherein said fused, stretched, and twisted biconical means for coupling varies symmetrically from a substantially dumbbell-shaped cross-section to a substantially elliptical-shaped cross-section.

18. The fiber optic coupler of claim 17 further comprising fiber twisting beyond said ends of said coupling means.

* * * * *